(12) United States Patent
Lin

(10) Patent No.: US 11,678,310 B2
(45) Date of Patent: Jun. 13, 2023

(54) METHOD FOR DETERMINING TRANSMISSION RESOURCES, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 79 days.

(21) Appl. No.: 17/217,984

(22) Filed: Mar. 30, 2021

(65) Prior Publication Data

US 2021/0219289 A1 Jul. 15, 2021

Related U.S. Application Data

(63) Continuation of application No. 16/897,077, filed on Jun. 9, 2020, now Pat. No. 10,993,229, which is a continuation of application No. PCT/CN2017/116236, filed on Dec. 14, 2017.

(51) Int. Cl.
 *H04W 72/0446* (2023.01)
 *H04W 72/23* (2023.01)
 *H04W 72/04* (2023.01)

(52) U.S. Cl.
 CPC ....... *H04W 72/0446* (2013.01); *H04W 72/23* (2023.01); *H04W 72/04* (2013.01)

(58) Field of Classification Search
 CPC ........... H04W 72/0446; H04W 72/042; H04W 72/04; H04W 72/044; H04W 72/23

USPC ......................................................... 370/329
See application file for complete search history.

(56) References Cited

U.S. PATENT DOCUMENTS

| | | | |
|---|---|---|---|
| 11,228,398 B2 * | 1/2022 | Park | ................. H04W 80/02 |
| 2012/0327877 A1 | 12/2012 | Zhao et al. | |
| 2017/0019881 A1 | 1/2017 | Cao et al. | |
| 2018/0160418 A1 | 6/2018 | Luo et al. | |
| 2019/0116608 A1 | 4/2019 | Kim et al. | |

(Continued)

FOREIGN PATENT DOCUMENTS

| | | |
|---|---|---|
| CN | 102083209 A | 6/2011 |
| CN | 102316587 A | 1/2012 |

(Continued)

OTHER PUBLICATIONS

"3rd Generation Partnership Project Technical Specification Group Radio Access Network; NR; Physical layer procedures for control (Release 15)" 3GPP TS 38.213 V1.1.1 (Nov. 2017). 40 pages.

(Continued)

*Primary Examiner* — Rownak Islam
(74) *Attorney, Agent, or Firm* — Perkins Coie LLP

(57) ABSTRACT

A method for determining transmission resources includes: receiving resource information from a network device, wherein the resource information indicates a slot format of a slot; determining an available resource among at least one first resource in the slot according to the resource information, wherein the at least one first resource is semi-statically configured or semi-persistently scheduled for carrying data; and performing transmission of the data via the available resource with the network device.

15 Claims, 5 Drawing Sheets

(56) References Cited

U.S. PATENT DOCUMENTS

| | | | |
|---|---|---|---|
| 2019/0327020 A1* | 10/2019 | Gao | H04L 1/0067 |
| 2019/0357224 A1 | 11/2019 | Li et al. | |
| 2020/0120682 A1 | 4/2020 | Li et al. | |
| 2020/0145174 A1 | 5/2020 | Liang et al. | |
| 2020/0178346 A1* | 6/2020 | Wang | H04L 5/00 |
| 2020/0213031 A1 | 7/2020 | Gao | |
| 2020/0337025 A1 | 10/2020 | Tang | |
| 2021/0045150 A1* | 2/2021 | Kim | H04L 1/1812 |

FOREIGN PATENT DOCUMENTS

| | | |
|---|---|---|
| CN | 102932934 A | 2/2013 |
| CN | 106851744 A | 6/2017 |
| CN | 106922031 A | 7/2017 |
| CN | 107347212 A | 11/2017 |
| RU | 2518388 C2 | 6/2014 |
| WO | 2016176965 A1 | 11/2016 |
| WO | 2017156787 A1 | 9/2017 |
| WO | 2017164698 A1 | 9/2017 |
| WO | 2017193306 A1 | 11/2017 |
| WO | 2019029741 A1 | 2/2019 |

OTHER PUBLICATIONS

First Office Action of the Chinese application No. 202010386925 X, dated Apr. 1, 2022. 15 pages with English Translation.
Second Office Action of the Japanese application No. 2020-531906, dated Jun. 3, 2022. 4 pages with English Translation.
Written Opinion of the Singaporean application No. 11202005538V, dated Mar. 17, 2022. 11 pages.
First Office Action of the Canadian application No. 3085485, dated Jul. 5, 2021. 3 pages.
Office Action of the Indian application No. 202017029766, dated Jul. 26, 2021. 6 pages with English translation.
Corrected Notice of Allowability dated Apr. 1, 2021 of U.S. Appl. No. 16/897,077, filed Jun. 9, 2020. 6 pages.
First Office Action of the Russian application No. 2020122549, dated Jan. 25, 2021.
International Search Report in the international application No. PCT/CN2017/116236, dated Jul. 27, 2018.
MCC Support; "Final Report of 3GPP TSG RAN WG1 #90 v1.0.0" (Prague, Czech Rep, Aug. 21-25, 2017), 3GPP TSG RAN WG1 Meeting #90bis, R1-1716941, Prague, Czech Rep, Oct. 9-13, 2017.
NTT DOCOMO, INC., Offline summary for AI 7.3.3.4 UL data transmission procedure, Discussion and Decision, 3GPP TSG RAN WG1 Meeting #91 R1-1721510, Nov. 27-Dec. 1, 2017 (Nov. 27, 2017-Dec. 1, 2017).
Qualcomm Incorporated, Offline discussion on GC-PDCCH carrying SFI, Discussion and Decision, 3GPP TSG RAN WG1 #91, R1-1721702, Nov. 27-Dec. 1, 2017 (Nov. 27-Dec. 1-2017).

Supplementary European Search Report in the European application No. 17934963.4, dated Sep. 29, 2020.
Written Opinion of the International Search Authority in the international application No. PCT/CN2017/101093, dated Nov. 29, 2017.
Written Opinion of the International Search Authority in the international application No. PCT/CN2017/116236, dated Jul. 27, 2018.
Huawei et al: "Configuration on Type 1 Grant-Free for Active UE", 3GPP Draft; R2-1711430 Configuration on Type 1 Grant-Free for Active UE, 3rd Generation Partnership Mobile Competence Centre:650, Route Des Lucioles; F-06921 Sophia-Antipolia Cedex,Project (3GPP), vol. RAN WG2, no. Prague, Czech Republic; Oct. 9, 2017-Oct. 138, 2017 Oct. 2017 (Oct. 8, 2017), XP051343415 Retrieved from the Internet URL: http://www.3gpp. org/ftp/ Meetings 3GPP SYNC/RAN2/Docs/ [ retrieved on Oct. 8, 2017] * Section 2.2 *.
"3rd Generation Partnership Project; Technical Specification Group Radio AccessNetwork; NR; Physical layer procedures for control (Release 15)", 3GPP Standard; Technical Specification; 3GPP TS 38.213, 3rd Generation Partnership Project (3GPP),Mobile Competence Centre; 650, Route Des Lucioles; F-06921 Sophia-Antipolis Cedex; France, vol. RAN WG1, no. V1.1.2, Dec. 12, 2017 (Dec. 12, 2017), pp. 1-38, XP051391917, [ retrieved on Dec. 12, 2017] * whole section 11.1 *.
Sony: "On remaining details on group-common PDCCH", 3GPP Draft: R1-1716247. 3rd Generation Partnership Project (3GPP), Mobile Competence Centre; 650, Route Des Lucioles; F-06921 Sophia-Antipolis Cedex; France,vol. RAN WG1, no. Nagoya, Japan; Sep. 18, 2017-Sep. 9, 2117 Sep. 18, 2117-Sep. 9, 2017 (Sep. 17, 2017), XP051339704, Retrieved from the Internet: URL: http:// www.3gpp. org/ftp/Meetings 3GPP SYNC/RAN1/Docs/ [ retrieved on Sep. 17, 2017] * Section 3 *.
CATT: "[89-20] email discussion: Group-common PDCCH for NR", 3GPP Draft; R1-1710968, 3rd Generation Partnership Project (3GPP), Mobile Competence Centre; 650, Route Des Lucioles F-06921 Sophia-Antipolis Cedex; France, vol. RAN WG1, no. Qingdao; Jun. 27, 2017-Jun. 30, 2010, Jun. 27-Jun. 30, 2010 Jun. 28, 2017 (Jun. 28, 2017), XP051305938, Retrieved from the Internet: URL: http://www.3gpp. org/ftp/tsg_ran/WG1 RL1/TSGR1 AH/NR AH 1706/Docs/ [ retrieved on Jun. 28, 2017] *p. 17*.
First Office Action of the U.S. Appl. No. 16/897,077, dated Sep. 2, 2020.
Notice of Allowance of the U.S. Appl. No. 16/897,077, dated Dec. 30, 2020.
First Office Action of the Japanese application No. 2020-531906, dated Dec. 7, 2021. 8 pages with English translation.
Supplementary European Search Report in European application No. 21195142.1, dated Feb. 8, 2022. 12 pages.
Vivo. Remaining details on group-common PDCCH, 3GPP TSG RAN WG1 Meeting 91 R1-1719782, Reno, USA, November 27-Dec. 1, 2017. 6 pages.

* cited by examiner

100

```
At least one first resource is determined in a target time
unit, the at least one first resource being for carrying         ⌒ S110
grant-free data and/or semi-persistently scheduled data
                              │
                              ▼
Resource information is received from a network device,
the resource information indicating a resource allocation        ⌒ S120
           in the target time unit
                              │
                              ▼
An available resource is determined among the at least
one first resource according to the resource information         ⌒ S130
                              │
                              ▼
Transmission of the grant-free data and/or semi-
persistently scheduled data is performed via the available       ⌒ S140
       resource with the network device
```

FIG. 1

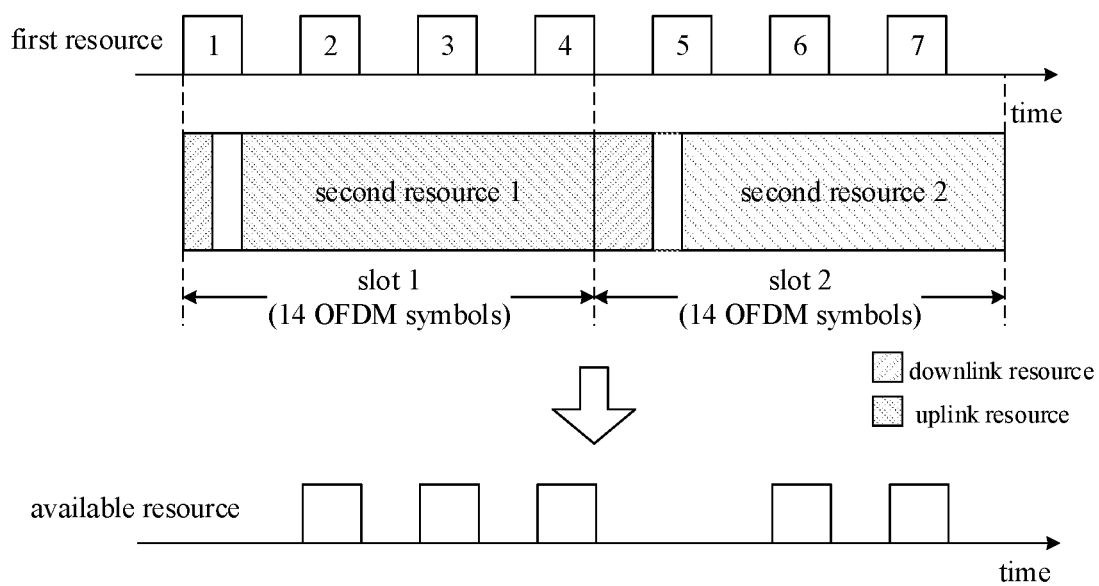

FIG. 2

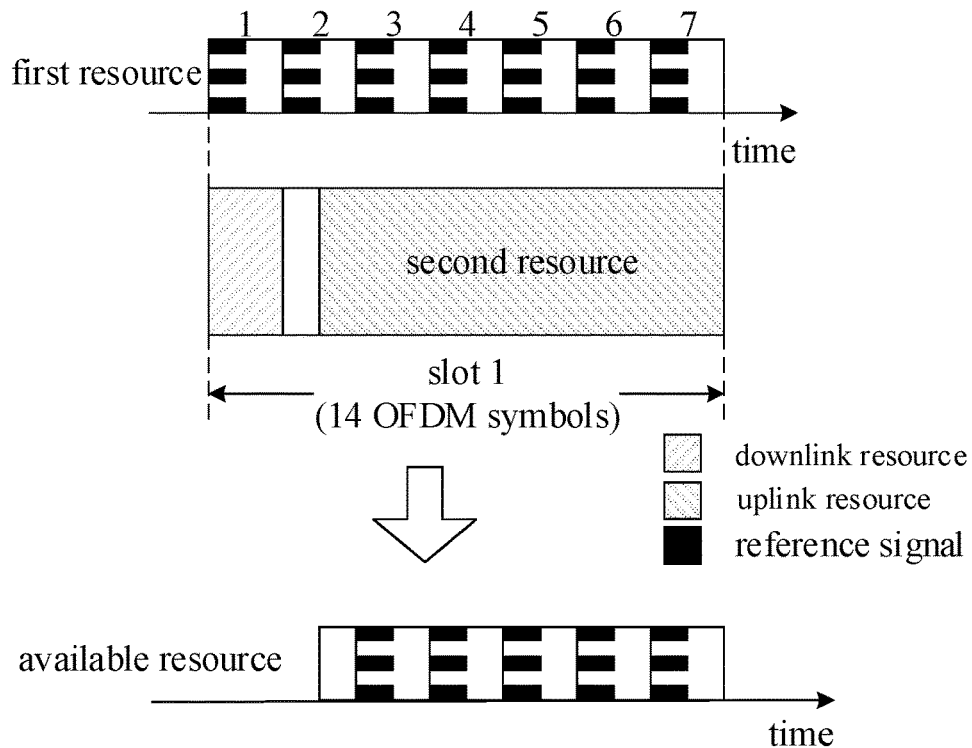

At least one first resource is determined in a target time unit, the at least one first resource being for carrying grant-free data and/or semi-persistently scheduled data — S210

A resource allocation of a terminal device is determined in the target time unit — S220

An available resource is determined among the at least one first resource according to the resource allocation — S230

Transmission of the grant-free data and/or semi-persistently scheduled data is performed via the available resource with the terminal device — S240

FIG. 6

METHOD FOR DETERMINING TRANSMISSION RESOURCES, TERMINAL DEVICE AND NETWORK DEVICE

CROSS-REFERENCE TO RELATED APPLICATIONS

The present application is a continuation of U.S. application Ser. No. 16/897,077 filed on Jun. 9, 2020, which is a continuation of International Application No. PCT/CN2017/116236 filed on Dec. 14, 2017, the contents of which are hereby incorporated by reference in its entirety.

BACKGROUND

A present 5th Generation (5G) system has introduced Ultra-reliable Low Latency Communication (URLLC), which has a feature that ultra-reliable (for example, 99.999%) transmission is achieved with an extremely low latency (for example, 1 ms). The concept of grant free is put forward to achieve such a goal. The grant free can adopt a preconfigured or a semi-persistently resource configuration so that a terminal device can transmit data on configured resources according to service requirements. The technology can avoid a Schedule Request (SR) process and a Buffer Status Report (BSR) process, thereby increasing an effective transmission time of the terminal device.

The 5G system notifies a time slot format in a semi-static or dynamic way in order to support a flexible configuration of uplink resources and downlink resources. For example, the terminal device receives a signaling to obtain Slot Format related Information (SFI), and determines a situation of uplink time-domain resources and downlink time-domain resources in each time slot, such as the number of time-domain symbols and their locations.

In addition, the 5G system has also introduced the concept of Bandwidth Part (BWP). The system bandwidth supported by a New Radio (NR) system is much greater than the maximum system bandwidth of 20 MHz of a Long Term Evolution (LTE) system. Some terminal devices may not support an entirety of the system bandwidth due to their limited capabilities, thus the concept of BWP is introduced, which can furthermore improve the scheduling efficiency. Within a carrier, a network device can configure one or more BWPs for the terminal device, but only one BWP is activated at one time and used for data transmission.

Because the SFI, the BWP and the grant free transmission resources are configured independently, the semi-statically configured transmission resources may not adapt to an actual situation of transmission resources, and there may be conflicts in resource configuration, particularly in the case that the SFI is dynamically indicated.

SUMMARY

The disclosure relates to the technical field of communications, and particularly to a method for determining transmission resources, a terminal device and a network device.

Implementations of the disclosure provide a method for determining transmission resources, a terminal device and a network device.

A first aspect provides a method for transmission of uplink data, applied to a terminal device, including: a first resource is determined according to a configuration signaling, the first resource being for transmission of the uplink data; and in response to that a quantity of first symbols is greater than a preset value, uplink data is sent on the first symbols, the first symbols being symbols in the first resource that are included in a second resource, and the second resource being determined by the terminal device based on received resource information.

A second aspect provides a method for transmission of uplink data, applied to a network device, including: a configuration signaling is sent to a terminal device, the configuration signaling being for the terminal device to determine a first resource, and the first resource being for transmission of the uplink data; resource information is sent to the terminal device, the resource information being for the terminal device to determine a second resource; and in response to that a quantity of first symbols is greater than a preset value, uplink data is received on the first symbols, the first symbols being symbols in the first resource that are included in the second resource.

A third aspect provides a terminal device, comprising: a memory storing processor-executable instructions; and a processor arranged to execute the stored processor-executable instructions to perform operations of: determining a first resource according to a configuration signaling, the first resource being for transmission of uplink data; and in response to that a quantity of first symbols is greater than a preset value, sending uplink data on the first symbols, the first symbols being symbols in the first resource that are included in a second resource, and the second resource being determined by the terminal device based on received resource information.

BRIEF DESCRIPTION OF DRAWINGS

FIG. 1 is a schematic flowchart illustrating a method for determining transmission resources according to an implementation of the disclosure.

FIG. 2 is a schematic diagram illustrating a first resource, a second resource and an available resource according to an implementation of the disclosure.

FIG. 5 is a schematic diagram illustrating a first resource, a second resource and an available resource according to another implementation of the disclosure.

FIG. 6 is another schematic flowchart illustrating a method for determining transmission resources according to an implementation of the disclosure.

DETAILED DESCRIPTION

Figure 3:
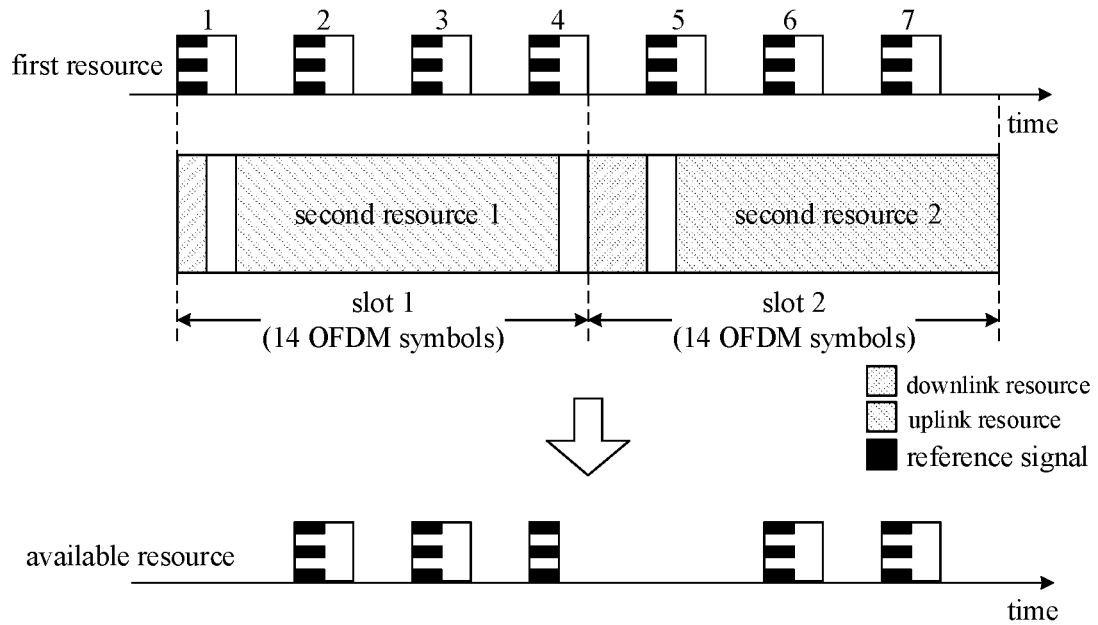
FIG. 3 is a schematic diagram illustrating a first resource, a second resource and an available resource according to another implementation of the disclosure.

The technical solutions according to implementations of the disclosure will be described below in combination with the drawings.

The technical solutions of the implementations of the application may be applied to various communication systems, for example, a Global System of Mobile Communication (GSM), a Code Division Multiple Access (CDMA)

system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system or a New Radio (NR) system.

The terminal device according to the implementation of the disclosure may be a User Equipment (UE), an access terminal, a user unit, a user station, a mobile station, a mobile platform, a remote station, a remote terminal, a mobile device, a user terminal, a terminal, a wireless communication device, a user proxy or a user device. The terminal can also be a cell phone, a cordless telephone, a Session Initiation Protocol (SIP) telephone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like. The terminal device is not limited to those described above in implementations of the disclosure.

The network device according to the implementation of the disclosure may be a device communicating with a terminal device. The network device may be a Base Transceiver Station (BTS) in the GSMC or the CDMA system, may also be a Node B (NB) in the WCDMA system, and may further be an Evolutional Node B (eNB or eNodeB) in the LTE system or a wireless controller in a Cloud Radio Access Network (CRAN) scenario. Or the network device may be a relay station, an access point, a vehicle-mounted device, a wearable device, a network-side device in a future 5G network, a network device in a future evolved Public Land Mobile Network (PLMN) or the like. The network device is not limited to those described above in implementations of the disclosure.

FIG. 1 is a schematic flowchart illustrating a method 100 for determining transmission resources according to an implementation of the disclosure. The method 100 may be performed by a terminal device. As illustrated in FIG. 1, the method 100 includes the following operations: S110, at least one first resource is determined in a target time unit, the at least one first resource being for carrying at least one of grant-free data or semi-persistently scheduled data; S120, resource information is received from a network device, the resource information indicating a resource allocation in the target time unit; S130, an available resource is determined among the at least one first resource according to the resource information; and S140, transmission of at least one of the grant-free data or semi-persistently scheduled data is performed via the available resource with the network device.

In operation S110, the terminal device determines the at least one first resource in the target time unit, which specifically includes the following operation: the terminal device receives a configuration signaling from the network device, the configuration signaling indicating the at least one first resource. Specifically, the at least one first resource may be for carrying grant-free data and/or semi-persistently scheduled data.

Currently there are mainly two ways for configuring grant free resources: the first way is to (semi-statically) configure the grant-free resources using a Radio Resource Control (RRC) signaling which can include time-domain and frequency-domain resources, reference symbol information, modulation and coding schemes, and power control parameters. Another way is to configure the grant free resources using a method combining the RRC signaling and a physical layer signaling. The RRC signaling configuration includes a time-domain resource cycle and power control parameters, and the physical layer signaling includes frequency-domain resources, reference symbol information, and modulation and coding schemes. According to an implementation of the disclosure, the at least one first resource may be configured by using any one of the above ways, but implementations of the disclosure are not limited thereto.

In some implementations of the disclosure, the at least one first resource may be a cyclic resource or a non-cyclic resource. Specifically, the terminal device determines the at least one first resource, each one of which can include at least one time-domain symbol and the numbers of the time-domain symbols included in each of the at least one first resource may be same or different.

For example, as illustrated in FIG. 2, taking the at least one first resource as a cyclic resource as an example, a cycle of the at least one first resource is 4 time-domain symbols. Specifically, FIG. 2 illustrates 7 first resources included in the at least one first resource: 1 to 7 respectively; each first resource includes two time-domain symbols and any two adjacent first resources are separated by two time-domain symbols. The first resources 1 to 4 correspond to a slot 1 and the first resources 5 to 7 correspond to a slot 2. Here as an example, the target time unit is the slot 1, then the at least one first resource includes 4 first resources, which are first resources 1 to 4 in FIG. 2, in the target time unit. According to an implementation of the disclosure, in FIG. 2, the time-domain symbol may be an Orthogonal Frequency Division Multiplexing (OFDM) symbol.

According to an implementation of the disclosure, the at least one resource may be an uplink resource or a downlink resource, in other words, the first resource may be configured for transmission of uplink data or downlink data, but implementations of the disclosure are not limited thereto.

In operation S120, the terminal device can receive, from the network device, resource information configured to indicate a resource allocation in the target time unit. According to an implementation of the disclosure, the resource information may be configured to indicate at least one Bandwidth Part (BWP) and/or the resource information may be configured to indicate a slot format of the target time unit. Specifically, the terminal device can receive, from the network device, a configuration signaling for carrying the resource information. For example, the configuration signaling may be a RRC signaling, but implementations of the disclosure are not limited thereto.

According to an implementation of the disclosure, the resource information may be configured to indicate at least one BWP. The network device can configure one or more BWPs for the terminal device, but in general situations, the terminal device can activate only one BWP each time, and the resource information may be configured to indicate the activated BWP. According to an implementation of the disclosure, the resource information may be configured to indicate other BWP(s), but implementations of the disclosure are not limited thereto. Specifically, any one BWP indicated by the resource information can include three parameters: a numerology, a center frequency point and a bandwidth. The numerology can represent a Subcarrier Spacing (SCS); the bandwidth is less than or equal to a maximum system bandwidth.

According to an implementation of the disclosure, the resource information can also be configured to indicate the slot format in the target time unit. The slot format can include positions and a number of the time-domain symbols included in the target time unit.

In some implementations of the disclosure, the terminal device can determine the resource allocation, which includes the BWP of the terminal device and the slot format, according to the resource information, and then determine at least one second resource in the target time unit, which is allocated by the network device for the terminal device and which may be an uplink resource or a downlink resource, so that the terminal device can use the at least one second resource for transmission of data with the network device.

In operation S130, the terminal device determines an available resource among the at least one first resource according to the resource information. Specifically, the terminal can determine at least one second resource in the target time unit, which corresponds to the resource information, and can further determine a target feature of the at least one second resource and a target feature of the at least one first resource; when the target feature of the at least one first resource is same as the target feature of the at least one second resource, at least one overlapping resource between the at least one first resource and the at least second resource is determined and the available resource is determined among the at least one overlapping resource. According to an implementation of the disclosure, the terminal device can determine whether a target overlapping resource in the at least one overlapping resource is the available resource according to a preset condition, herein, the target overlapping resource is any one resource of the at least one overlapping resource.

It is to be understood that the target feature can include at least one of: a transmission direction, a subcarrier spacing or a cyclic prefix length. The transmission direction is that both the at least one first resource and the at least one second resource are used for an uplink transmission or a downlink transmission.

According to an implementation of the disclosure, in the target time unit, each of the at least one overlapping resource can include at least one time-domain symbol. Accordingly, a preset condition used by the terminal device in determining whether a target overlapping resource among the at least one overlapping resource is the available resource can include: the target overlapping resource may be determined as the available resource when a number of the at least one time-domain symbol included in the target overlapping resource is greater than or equal to a preset value.

It is to be understood that the preset value in the preset condition may be set according to an actual situation. According to an implementation of the disclosure, the preset value may be set in advance. Specifically, the terminal device receives, from the network device, configuration information configured to indicate the preset value, and the terminal device determines the preset value according to the configuration information.

According to an implementation of the disclosure, the preset value can also be determined by the terminal device according to the number of the time-domain symbols included in one of the at least one first resource. Specifically, the numbers of the time-domain symbols included in the at least one first symbol may be the same from one another, and the preset value may be equal to the number of the time-domain symbols included in each of the at least one first resource. The numbers of the time-domain symbols included in the at least one first resource can also be different from one another, in this case, the preset value may be equal to a maximum value of the numbers of the time-domain symbols included in the at least one first resource or a minimum value of the numbers of the time-domain symbols included in the at least one first resource. The maximum value is a number of time-domain symbols included in a first resource including a maximum number of the time-domain symbols, among the at least one first resource; and the minimum value is a number of time-domain symbols included in a first resource including a minimum number of the time-domain symbols, among the at least one first resource; or the preset value may also be equal to a number of the time-domain symbols included in the first resource corresponding to the target overlapping resource.

For example, as illustrated in FIG. 2, assuming that the target time unit includes a slot 1 and a slot 2 and each slot includes 14 time-domain symbols, such as for example OFDM symbols; in addition, FIG. 2 also illustrates 7 first resources, which are respectively numbered 1 to 7 and included in the at least one first resource in the target time unit, and two second resources, which are respectively numbered 1 and 2 and included in the target time unit. The 7 first resources and the 2 second resources are used for the uplink transmission and are all uplink resources, and the preset condition is set as: if the number of the time-domain symbols included in the target overlapping resource among the multiple overlapping resources between the 7 first resources and the 2 second resources is greater than or equal to the preset value, the target overlapping resource is determined as the available resource. According to an implementation of the disclosure, assuming that each of the 7 first resources includes same number of time-domain symbols, for example, each first resource includes two OFDM symbols, and the preset value in the preset condition may be equal to the number of the time-domain symbols included in each first resource, that is to say, the preset value is equal to two OFDM symbols. Taking the first resource 3 as an example, an overlapping part between the first resource 3 and two second resources is the target overlapping resource, and the number of the time-domain symbols included in the target overlapping resource is equal to two OFDM symbols, as a result, the target overlapping resource may be determined as the available resource. Taking the first resource 5 as another example, an overlapping part between the first resource 5 and two second resources is the target overlapping resource, and the number of the time-domain symbols included in the target overlapping resource is less than two OFDM symbols, as a result, the target overlapping resource does not belong to the available resource. In the same manner, the overlapping resources between the 7 first resources and the 2 second resources, which are determined as the available resources, are resources corresponding to the first resources 2, 3, 4, 6 and 7.

Taking FIG. 2 as another example again, assuming that the time-domain symbols included in the 7 first resources are different from one another, then the preset value may be set as the maximum value or the minimum value of the numbers of the time-domain symbols included in the at least one first resource or the preset value can also be set as a size of the first resource corresponding to the target overlapping resource. Taking the first resource 5 as an example, the overlapping part between the first resource 5 and the two resources is the target overlapping resource. Because the target overlapping resource is merely a part of the first resource 5, in other words, the number of the time-domain symbols included in the target overlapping resource is less than the number of the time-domain symbols included in the first resource 5. As a result, the target overlapping resource corresponding to the part of the first resource 5 does not belong to the available resource.

According to an implementation of the disclosure, the at least one first resource includes a resource occupied by a reference signal in the target time unit; and accordingly, at least one overlapping resource can also include the resource occupied by the reference signal, and accordingly the preset condition that the terminal device determines whether the target overlapping resource among the at least one overlapping resource is the available resource can include: if the target overlapping resource among the at least one overlapping resource includes the resource occupied by the reference signal and the reference signal includes part or all of reference signals corresponding to a target antenna interface, then the target overlapping resource is determined as the available resource and the target antenna interface is an antenna interface of at least one antenna interface configured for transmission of the grant-free data and/or the semi-persistently scheduled data.

It is to be understood that if the target overlapping resource includes the resource occupied by the reference signal and the reference symbol includes part of the reference signals corresponding to the target antenna interface, the part of the reference signals may also be used for implementing channel estimation.

For example, as illustrated in FIG. 3, assuming that a target time unit includes a slot 1 and a slot 2 and each slot includes 14 time-domain symbols, such as for example OFDM symbols; in addition, FIG. 3 illustrates 7 first resources, which are respectively numbered 1 to 7 and included in the at least one first resource in the target time unit, and two second resources, which are respectively numbered 1 and 2 and included in the target time unit. The 7 first resources and the 2 second resources are all used for the uplink transmission and are all uplink resources. The 7 first resources each include resources occupied by a reference signal, which are illustrated as the parts in black blocks in each first resource. Herein, the preset condition is set as: if a target overlapping resource among multiple overlapping resources between the 7 first resources and the 2 second resources includes the reference signal and the reference signal includes all of reference signals corresponding to a target antenna interface, then the target overlapping resource is determined as the available resource.

According to an implementation of the disclosure, taking the first resource 2 in FIG. 3 as an example, the overlapping part between the first resource and two second resources includes an entirety of the first resource 2, in other words, the target overlapping resource is the entirety of the first resource 2 and includes the resource occupied by all the reference signals in the first resource 2. As a result, according to a preset rule, the target overlapping resource corresponding to the first resource 2 may be determined as the available resource.

According to an implementation of the disclosure, taking the first resource 4 in FIG. 3 as an example, an overlapping part between the first resource 4 and the two second resources merely includes a left half part of the first resource 4, in other words, the target overlapping resource is the left half part of the first resource 4, but the target overlapping resource includes a resource occupied by all reference signals in the first resource 4. As a result, according to the preset rule, the target overlapping resource corresponding to the first resource 4 is determined as the available resource, that is to say, the available resource is merely the left half part of the first resource 4.

According to an implementation of the disclosure, taking the first resource 5 in FIG. 3 as an example, an overlapping part between the first resource 4 and the two second resources merely includes a right half part of the first resource 5, in other words, the target overlapping resource is the right half part of the first resource 5, but the target overlapping resource does not include a resource occupied by all reference signals in the first resource 5. As a result, according to the preset rule, it may be determined that the target overlapping resource corresponding to the first resource 5 does not belong to the available resource, that is to say, the available resource does not include the first resource 5.

As a result, as illustrated in FIG. 3, according to the above preset rule, the available resource, which may be determined, may be illustrated in FIG. 3, herein each available resource includes the resource occupied by the reference signal and the reference signal includes all of reference signals of the corresponding antenna interface.

Figure 4:
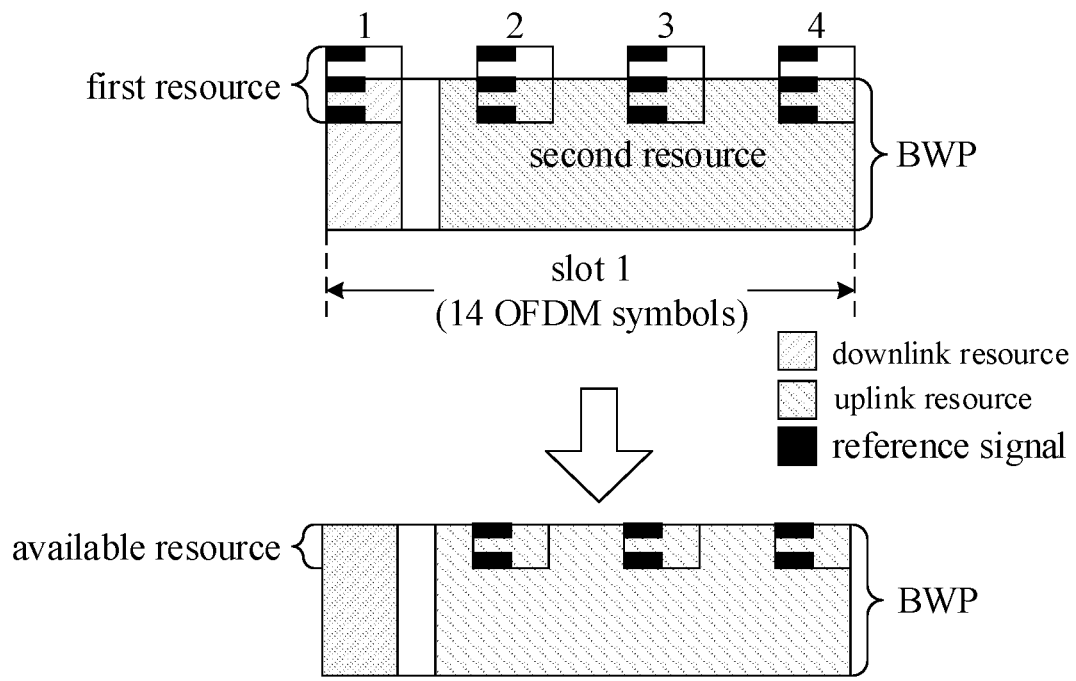
FIG. 4 is a schematic diagram illustrating a first resource, a second resource and an available resource according to another implementation of the disclosure.

For another example, as illustrated in FIG. 4, assuming that a target time unit includes a slot 1 which includes 14 time-domain symbols, such as for example OFDM symbols; in addition, herein assuming that a terminal device merely activates one BWP as illustrated in FIG. 4, one second resource numbered 1 may be determined according to the target time unit and the BWP. Furthermore, FIG. 4 illustrates 4 first resources, which are respectively numbered 1 to 4 and included in at least one first resources; the 4 first resources and the 1 second resources are all used for an uplink transmission and are all uplink resources. The 4 first resources each include resources occupied by a reference signal, which are illustrated as the parts in black blocks in each first resource. Herein, the preset condition is set as: if a target overlapping resource among multiple overlapping resources between the 4 first resources and the 1 second resources includes the reference signal and the reference signal includes part or all of reference signals corresponding to a target antenna interface, then the target overlapping resource is determined as an available resource.

According to an implementation of the disclosure, taking the first resource 1 in FIG. 4 as an example, there is no overlapping resource between the first resource 1 and the second resource; as a result, there is no available resource in the first resource 1.

According to an implementation of the disclosure, taking the first resource 3 in FIG. 4 as an example, an overlapping resource between the first resource 3 and the second resource is a lower half part of the first resource 3, in other words, the target overlapping resource corresponding to the first resource 3 is the lower half part of the first resource 3. Because the target overlapping resource includes the resource occupied by the reference signal and the reference signal includes part of the reference signals in the first resource 3, the target overlapping resource corresponding to the first resource 3 is determined as the available resource.

In the same manner, among the 4 first resources in FIG. 4, the lower half parts of the first resource 2, the first resource 3 and the first resource 4 can all be determined as the available resource. It is to be understood that as the available resource merely includes the resource occupied by part of the reference signals, the part of the reference signals can also be used for implementing channel estimation.

According to an implementation of the disclosure, if the at least one first resource includes a first sub-resource and a second sub-resource, and the first sub-resource is adjacent to the second sub-resource in time domain or frequency domain, the first sub-resource includes a resource occupied by a first reference signal and the second sub-resource includes a resource occupied by a second reference signal, then the preset condition can include: if a first target overlapping resource does not include the resource occupied by the first reference signal or includes part of the resource occupied by the first reference signal and if a second target overlapping resource includes all or part of the resource occupied by the second reference signal, then the first target overlapping resource and the second target overlapping resource are all determined as the available resource, the first target overlapping resource being an overlapping resource between the first sub-resource and the at least one second resource, and the second target overlapping resource being an overlapping resource between the second sub-resource and the at least one second resource.

It is to be understood that, if the first target overlapping resource does not include the resource occupied by the first reference signal at all and the second target overlapping resource includes all or part of the resource occupied by the second reference signal, accordingly, then the second reference signal is used to estimate a channel corresponding to the first target overlapping resource and/or a channel corresponding to the second target overlapping resource.

It is to be understood that, if the first target overlapping resource includes part of the resource occupied by the first reference signal and the second target overlapping resource includes all or part of the resource occupied by the second reference signal, then the first reference signal and the second reference signal are used for joint estimation of the channel corresponding to the first target overlapping resource and/or the channel corresponding to the second target overlapping resource.

For example, as illustrated in FIG. 5, assuming that a target time unit includes a slot 1 which includes 14 time-domain symbols, such as for example OFDM symbols; in addition, FIG. 4 illustrates 7 first resources, which are numbered 1 to 7 respectively and included in at least one first resource in the target time unit and the 7 first resources are continuous in the time domain; the target time unit also includes one second resource, and the 7 first resources and 1 second resource are all used for an uplink transmission and are all uplink resources, and the 7 first resources each include resources occupied by a reference signal, which are illustrated as the parts in black blocks in each first resource.

Specifically as illustrated in FIG. 5, an overlapping resource between the first resource 2 among the 7 first resources and the second resource does not include the resource occupied by the reference signal, that is to say, the first resource 2 may be a first sub-resource, and the overlapping resource between the first resource 2 and the second resource is namely the first target overlapping resource that does not include the resource occupied by the reference signal. An overlapping resource between the first resource 3, which is adjacent to the first resource 2, among the 7 first resources and the second resource includes the resource occupied by the reference signal and includes the resource occupied by all the corresponding reference signals. In other words, the first resource 3 may be a second sub-resource, and an overlapping resource between the first resource 3 and the second resource is namely the second target overlapping resource that includes an entirety of the first resource 3, then the second target overlapping resource includes the resource occupied by all the reference signals in the first resource 3. As a result, according to the above preset condition, both the first target overlapping resource and the second target overlapping resource may be determined as an available resource. Because the first target overlapping resource is adjacent to the second target overlapping resource in the time domain, the reference signal carried in the second target overlapping resource can be used to perform channel estimation of a signal which is carried in the first target overlapping resource and a signal which is carried in the second target overlapping resource.

In some implementations of the disclosure, a terminal device determines the available resource among the first resources using the above method, and then performs transmission of grant-free data and/or semi-persistently scheduled data via the available resource with a network device in operation S140.

Specifically, if the available resource is the uplink resource, the terminal device determines the available resource using the above method and transmits the grant-free data and/or the semi-persistently scheduled data to the network device via the available resource. Similarly, the network device can determine the available resource so as to receive the grant-free data and/or semi-persistently scheduled data from the terminal device via the available resource. If the available resource is the downlink resource, the terminal device determines the available resource using the above method and receives the grant-free data and/or the semi-persistently scheduled data from the network device via the available resource. Similarly, the network can determine the available resource so as to transmit the grant-free data and/or the semi-persistently scheduled data to the terminal device via the available device.

As a result, in the method for determining transmission resources in some implementations of the disclosure, the terminal device determines, using the resources configured by the network device, the available resource among the at least one first resource configured for transmission of the grant-free data and/or the semi-persistently scheduled data in the target time unit, and uses the available resource for transmission of the grant-free data and/or the semi-persistently scheduled data. In this way, the semi-statically configured grant-free transmission resources are enabled to better adapt to an actual situation of the transmission resources, especially a situation in which time-domain and frequency-domain resources are dynamically indicated, thereby it is possible to avoid conflicts in the resource allocation.

The method for determining transmission resources according to the implementation of the disclosure is described in detail from a perspective of the terminal device with reference to FIG. 1 to FIG. 5. The method for determining transmission resources according to the implementations of the disclosure will be described from a perspective of the network device with reference to FIG. 6.

FIG. 6 is a schematic flowchart illustrating a method 200 for determining transmission resources according to an implementation of the disclosure. The method 200 may be performed by a network device. As illustrated in FIG. 6, the method 200 includes the following operations: S210, at least one first resource is determined in a target time unit, the at least one first resource being for carrying at least one of grant-free data or semi-persistently scheduled data; S220, a resource allocation of a terminal device is determined in the target time unit; S230, an available resource is determined among the at least one first resource according to the resource allocation; S240, transmission of at least one of the grant-free data or semi-persistently scheduled data is performed via the available resource with the terminal device.

As a result, in the method for determining transmission resources in some implementations of the disclosure, a network device configures a resource for a terminal device, so that the network device and the network device to determine an available resource among at least one first resource configured for transmission of grant-free data and/or semi-persistently scheduled data in a target time unit, and use the available resource for transmission of the grant-free data and/or the semi-persistently scheduled data. In this way, the semi-statically configured grant-free transmission resources are enabled to better adapt to an actual situation of the transmission resources, especially a situation in which time-domain and frequency-domain resources are dynamically indicated, thereby it is possible to avoid conflicts in the resource allocation.

According to an implementation of the disclosure, after the at least one first resource is determined in the target time unit, the method further includes the following operation: a configuration signaling, which is configured to indicate the at least one first resource, is transmitted to the terminal device.

According to an implementation of the disclosure, after the resource for the terminal device is configured in the target time unit, the method further includes the following operation: resource information, which is configured to indicate a resource allocation, is transmitted to the terminal device.

According to an implementation of the disclosure, the resource information indicates at least one bandwidth part and/or a slot format of the target time unit.

According to an implementation of the disclosure, the operation that the available resource is determined among the at least one first resource according to the resource allocation includes the following operations: at least one second resource is determined in the target time unit according to the resource allocation, the at least one second resource having a same target feature as a target feature of the at least one first resource; and the available resource is determined among an overlapping resource between the at least one first resource and the at least one second resource.

According to an implementation of the disclosure, the target carrier includes at least one of: a transmission direction, a subcarrier spacing or a cyclic prefix length.

According to an implementation of the disclosure, the operation that the available resource is determined among the overlapping resource between the at least one first resource and the at least one second resource includes the following operation: when a target overlapping resource in at least one overlapping resource between the at least one first resource and the at least one second resource satisfies a preset condition, the target overlapping resource is determined as the available resource.

According to an implementation of the disclosure, each of the at least one overlapping resource includes at least one time-domain symbol and the preset condition includes: the target overlapping resource is determined as the available resource when a number of the at least one time-domain symbol included in the target overlapping resource is greater than or equal to a preset value.

According to an implementation of the disclosure, the preset value is equal to a number of the time-domain symbols included in one of the at least one first resource.

According to an implementation of the disclosure, the method also includes the following operation: the configuration information, which is configured to indicate the preset value, is transmitted to the terminal device.

According to an implementation of the disclosure, the at least one overlapping resource includes the resource occupied by the reference signal and the preset condition includes: the overlapping resource is determined as the available resource when the target overlapping resource includes the resource occupied by the reference signal and the reference signal includes part or all of reference signals corresponding to a target antenna interface, the target antenna interface being an antenna interface of at least one antenna interface configured for transmission of the grant-free data and/or the semi-persistently scheduled data.

According to an implementation of the disclosure, the at least one first resource includes a first sub-resource and a second sub-resource, the first sub-resource is adjacent to the second sub-resource in time domain or frequency domain, the first sub-resource includes a resource occupied by a first reference signal and the second sub-resource includes a resource occupied by a second reference signal. The preset condition includes: a first target overlapping resource and a second target overlapping resource are determined as the available resource when the first target overlapping resource does not include the resource occupied by the first reference signal or includes part of the resource occupied by the first reference signal and when the second target overlapping resource includes all or part of the resource occupied by the second reference signal. The target overlapping resource includes the first target overlapping resource and the second target overlapping resource, and the first target overlapping resource is an overlapping resource between the first sub-resource and the at least one second resource, and the second target overlapping resource is an overlapping resource between the second sub-resource and the at least one second resource.

According to an implementation of the disclosure, the first reference signal and the second reference signal are used for joint channel estimation.

It is to be understood that the network device in the method 200 can correspond to the network device in method 100, and the terminal device in the method 200 can correspond to the terminal device in the method 100, which will not be elaborated here.

As a result, in the method for determining transmission resources in some implementations of the disclosure, the network device configures the resource for a terminal device, so that the network device and the network device to determine the available resource among at least one first resource configured for transmission of the grant-free data and/or the semi-persistently scheduled data in the target time unit, and use the available resource for transmission of the grant-free data and/or the semi-persistently scheduled data. In this way, the semi-statically configured grant-free transmission resource are enabled to better adapt to the actual situation of the transmission resources, especially the situation in which time-domain and frequency-domain resources are dynamically indicated, thereby it is possible to avoid conflicts in the resource allocation.

It is to be understood that, in each implementation of the disclosure, a magnitude of a sequence number of each process does not mean an execution sequence, the execution sequence of each process should be determined according to its function and an internal logic, and an implementation process of the implementation of the disclosure should not be limited.

In addition, in the disclosure, the term "and/or" is only an association relationship describing associated objects and represents that three relationships may exist. For example, A and/or B may represent three conditions, i.e., independent existence of A, existence of both A and B and independent existence of B. In addition, the character "/" in the disclosure usually represents that previous and next associated objects form an "or" relationship.

The method for determining transmission resources according to the implementation of the disclosure is described in detail with reference to FIG. 1 to FIG. 6, the terminal device and the network device in some implementations of the disclosure will be described with reference to FIG. 7 to FIG. 10.

Figure 7:
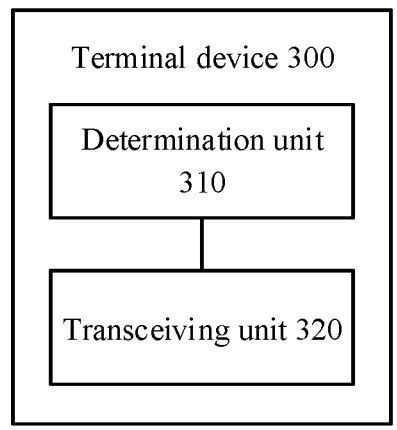
FIG. 7 is a schematic block diagram of a terminal device according to an implementation of the disclosure.

As illustrated in FIG. 7, a terminal device 300 according to the implementation of the disclosure includes a determination unit 310 and a transceiving unit 320. Specifically, the determination unit 310 is configured to determine at least one first resource for carrying grant-free data and/or semi-persistently scheduled data, in a target time unit; the transceiving unit 320 is configured to receive resource information, which is configured to indicate a resource allocation in the target time unit, from a network device; the determination unit 310 is also use to determine an available resource among the at least one first resource according to the resource information; the transceiving unit 320 is also configured for transmission of the grant-free data and/or the semi-persistently scheduled data via the available resource with the network device.

As a result, a terminal device in some implementations of the disclosure determines, using resources configured by a network device, the available resource among the at least one first resource configured for transmission of the grant-free data and/or the semi-persistently scheduled data in a target time unit, and uses the available resource for transmission of the grant-free data and/or the semi-persistently scheduled data. In this way, semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

According to an implementation of the disclosure, the transceiving unit 320 is specifically configured to receive, from the terminal device, a configuration signaling configured to indicate the at least one first resource.

According to an implementation of the disclosure, the resource information indicates at least one bandwidth part and/or a slot format of the target time unit.

According to an implementation of the disclosure, the determination unit 310 is specifically configured to determine at least one second resource in the target time unit according to the resource information, the at least one second resource having a same target feature as a target feature of the at least one first resource; and determine the available resource among an overlapping resource between the at least one first resource and the at least one second resource.

According to an implementation of the disclosure, the target carrier includes at least one of: a transmission direction, a subcarrier spacing or a cyclic prefix length.

According to an implementation of the disclosure, the determination unit 310 is specifically configured to determine target overlapping resources as the available resource when the target overlapping resources in the at least one overlapping resource between the at least one first resource and the at least one second resource satisfy a preset condition.

According to an implementation of the disclosure, each of the at least one overlapping resource includes at least one time-domain symbol and the preset condition includes: the target overlapping resource is determined as the available resource when a number of the at least one time-domain symbol included in the target overlapping resource is greater than or equal to a preset value.

According to an implementation of the disclosure, the preset value is equal to a number of the time-domain symbols included in one of the at least one first resource.

According to an implementation of the disclosure, the transceiving unit 320 is specifically configured to receive, from the network device, configuration information configured to indicate the preset value.

According to an implementation of the disclosure, the at least one overlapping resource includes the resource occupied by a reference signal and the preset condition includes: the overlapping resource is determined as the available resource when the target overlapping resource includes the resource occupied by the reference signal and the reference signal includes part or all of reference signals corresponding to a target antenna interface, the target antenna interface being an antenna interface of at least one antenna interface configured for transmission of the grant-free data and/or the semi-persistently scheduled data.

According to an implementation of the disclosure, the at least one first resource includes a first sub-resource and a second sub-resource, the first sub-resource is adjacent to the second sub-resource in time domain or frequency domain, the first sub-resource includes a resource occupied by a first reference signal and the second sub-resource includes a resource occupied by a second reference signal. The preset condition includes: a first target overlapping resource and a second target overlapping resource are determined as the available resource when the first target overlapping resource does not include the resource occupied by the first reference signal or includes part of the resource occupied by the first reference signal and when the second target overlapping resource includes all or part of the resource occupied by the second reference signal. The target overlapping resource includes the first target overlapping resource and the second target overlapping resource, and the first target overlapping resource is an overlapping resource between the first sub-resource and the at least one second resource, and the second target overlapping resource is an overlapping resource between the second sub-resource and the at least one second resource.

According to an implementation of the disclosure, the first reference signal and the second reference signal are used for joint channel estimation.

It is to be understood that, the terminal device 300 according to implementation of the disclosure can execute the method 100 in some implementations of the disclosure and the above and other operations and/or functions of each unit in the terminal device 300 are respectively configured to implement corresponding process of the terminal device in each method of FIG. 1 to FIG. 6, which will not be elaborated for the sake of brevity.

As a result, a terminal device in some implementations of the disclosure determines, using resources configured by a network device, the available resource among the at least one first resource configured for transmission of the grant-free data and/or the semi-persistently scheduled data in a target time unit, and uses the available resource for transmission of the grant-free data and/or the semi-persistently scheduled data. In this way, the semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

Figure 8:
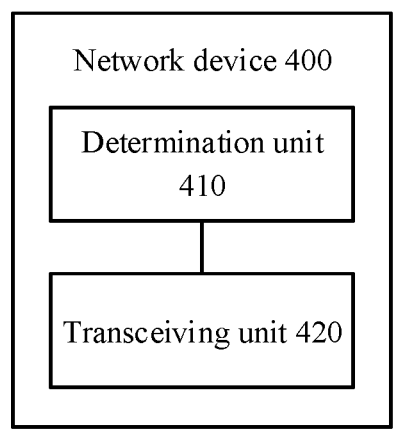
FIG. 8 is a schematic block diagram of a network device according to an implementation of the disclosure.

As illustrated in FIG. 8, a network device 400 according to the implementation of the disclosure includes a determination unit 410 and a transceiving unit 420. Specifically, the determination unit 410 is configured to determine at least one first resource in a target time unit, wherein the at least one first resource is for carrying at least one of grant-free data or semi-persistently scheduled data; the determination unit 410 is also configured to determine a resource allocation of a terminal device in the target time unit; the determination unit 410 is also configured to determine available resource among at least one first resource according to the resource allocation; the transceiving unit 420 is configured for transmission of at least one of the grant-free data or the semi-persistently scheduled data via the available resource with the network device.

As a result, the network device in some implementations of the disclosure configures a resource for the network device, so that the network device and the terminal device determine the available resource among the at least one first resource configured for transmission of the grant-free data and/or the semi-persistently scheduled data in a target time unit, and use the available resource for transmission of the grant-free data and/or the semi-persistently scheduled data. In this way, the semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

According to an implementation of the disclosure, the transceiving unit 420 is specifically configured to transmit a configuration signaling which is configured to indicate the at least one first resource, to the terminal device after the determination unit 410 determines the at least one first resource in the target time unit.

According to an implementation of the disclosure, the transceiving unit 420 is specifically configured to transmit resource information, which is configured to indicate the resource allocation, to the terminal device after the determination unit 410 determines resources configured for the terminal device in the target time unit.

According to an implementation of the disclosure, the resource information indicates at least one bandwidth part and/or a slot format of the target time unit.

According to an implementation of the disclosure, the determination unit 410 is specifically configured to determine at least one second resource in the target time unit according to the resource allocation, the at least one second resource having a same target feature as a target feature of the at least one first resource and determine the available resource among an overlapping resource between the at least one first resource and the at least one second resource.

According to an implementation of the disclosure, the target carrier includes at least one of: a transmission direction, a subcarrier spacing or a cyclic prefix length.

According to an implementation of the disclosure, the determination unit 410 is specifically configured to determine a target overlapping resource as the available resource when the target overlapping resources in the at least one overlapping resource between the at least one first resource and the at least one second resource satisfy a preset condition.

According to an implementation of the disclosure, each of the at least one overlapping resource includes at least one time-domain symbol and the preset condition includes: the target overlapping resource is determined as the available resource when a number of the at least one time-domain symbol included in the target overlapping resource is greater than or equal to a preset value.

According to an implementation of the disclosure, the preset value is equal to a number of the time-domain symbols included in one of the at least one first resource.

According to an implementation of the disclosure, the network device also does the following operation: configuration information, which is configured to indicate the preset value, is transmitted to the terminal device.

According to an implementation of the disclosure, the at least one overlapping resource includes the resource occupied by the reference signal and the preset condition includes: the overlapping resource is determined as the available resource when the target overlapping resource includes the resource occupied by the reference signal and the reference signal includes part or all of reference signals corresponding to a target antenna interface, the target antenna interface being an antenna interface of at least one antenna interface configured for transmission of the grant-free data and/or the semi-persistently scheduled data.

According to an implementation of the disclosure, the at least one first resource includes a first sub-resource and a second sub-resource, the first sub-resource is adjacent to the second sub-resource in time domain or frequency domain, the first sub-resource includes a resource occupied by a first reference signal and the second sub-resource includes a resource occupied by a second reference signal. The preset condition includes: a first target overlapping resource and a second target overlapping resource are determined as the available resource when the first target overlapping resource does not include the resource occupied by the first reference signal or includes part of the resource occupied by the first reference signal and when the second target overlapping resource includes all or part of the resource occupied by the second reference signal. The target overlapping resource includes the first target overlapping resource and the second target overlapping resource, and the first target overlapping resource is an overlapping resource between the first sub-resource and the at least one second resource, and the second target overlapping resource is an overlapping resource between the second sub-resource and the at least one second resource.

According to an implementation of the disclosure, the first reference signal and the second reference signal are used for joint channel estimation.

It is to be understood that, the terminal device 400 according to implementation of the disclosure can execute the method 200 in some implementations of the disclosure and the above and other operations and/or functions of each unit in the terminal device 400 are respectively configured to implement corresponding process of the terminal device in each method of FIG. 1 to FIG. 6, which will not be elaborated for the sake of brevity.

As a result, the network device in some implementations of the disclosure configures a resource for the network device, so that the network device and the terminal device determine the available resource among the at least one first resource, which is configured for transmission of the grant-free data and/or the semi-persistently scheduled data, in a target time unit, and use the available resource for transmission of the grant-free data and/or the semi-persistently scheduled data. In this way, the semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

Figure 9:
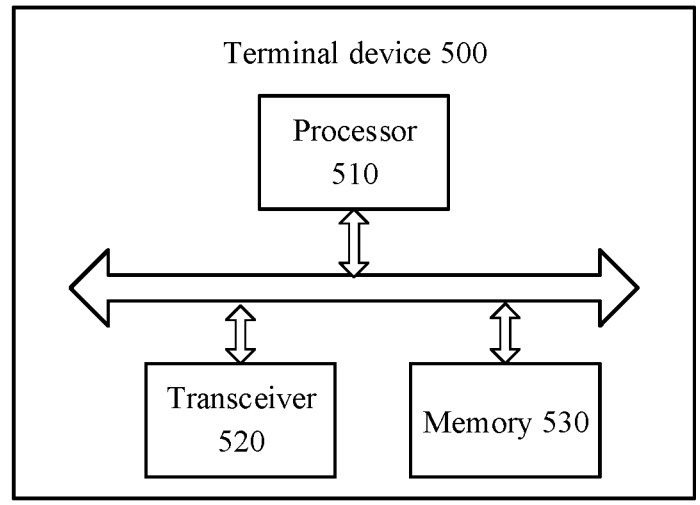
FIG. 9 is another schematic block diagram of a terminal device according to an implementation of the disclosure.

FIG. 9 is a schematic block diagram of a terminal device 500 according to an implementation of the disclosure. As illustrated in FIG. 9, the terminal device 500 includes a processor 510 and a transceiver 520, and the processor 510 connects to the transceiver 520. According to an implementation of the disclosure, the terminal device 500 also includes a memory 530, which connects to the processor 510. The processor 510, the memory 530, the transceiver 520 communicate with each other via an internal connection line to transfer and/or control a data signal. The memory 530 may be configured to store instructions, and the processor 510 is configured to execute the instructions stored in the memory 530 to control information or the signal transmitted by the transceiver 520. The processor 510 is configured to determine at least one first resource in a target time unit, and the at least one first resource is for carrying grant-free data and/or semi-persistently scheduled data. The transceiver 520 is configured to receive, from the network device, resource information configured to indicate a resource allocation in the target time unit. The processor 519 is also configured to determine an available resource among the at least one first resource according to the resource information. The transceiver 520 is also configured for transmission of the grant-free data and/or semi-persistently scheduled data via the available resource with the network device.

As a result, a terminal device in some implementations of the disclosure determines, using resources configured by a network device, the available resource among the at least one first resource, which is configured for transmission of the grant-free data and/or the semi-persistently scheduled data, in a target time unit, and uses the available resource for transmission of the grant-free data and/or the semi-persistently scheduled data. In this way, semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

According to an implementation of the disclosure, the transceiver 520 is also configured to receive, from the network device, a configuration signaling configured to indicate the at least one first resource.

According to an implementation of the disclosure, the resource information indicates at least one bandwidth part and/or a slot format of the target time unit. According to an implementation of the disclosure, the processor 510 is also configured to determine at least one second resource in the target time unit according to the resource information, the at least one second resource having a same target feature as a target feature of the at least one first resource and determine the available resource among an overlapping resource between the at least one first resource and the at least one second resource.

According to an implementation of the disclosure, the target feature includes at least one of: a transmission direction, a subcarrier spacing or a cyclic prefix length.

According to an implementation of the disclosure, the processor 510 is also configured to determine target overlapping resources as the available resource when the target overlapping resources in the at least one overlapping resource between the at least one first resource and the at least one second resource satisfy a preset condition.

According to an implementation of the disclosure, each of the at least one overlapping resource includes at least one time-domain symbol and the preset condition includes: the target overlapping resource is determined as the available resource when a number of the at least one time-domain symbol included in the target overlapping resource is greater than or equal to a preset value.

According to an implementation of the disclosure, the preset value is equal to a number of the time-domain symbols included in one of the at least one first resource.

According to an implementation of the disclosure, the transceiver 520 is also configured to receive, from the network device, configuration information configured to indicate the preset value.

According to an implementation of the disclosure, the at least one overlapping resource includes a resource occupied by a reference signal and the preset condition includes: the overlapping resource is determined as the available resource when the target overlapping resource includes the resource occupied by the reference signal and the reference signal includes part or all of reference signals corresponding to a target antenna interface, the target antenna interface being an antenna interface of at least one antenna interface configured for transmission of the grant-free data and/or semi-persistently scheduled data.

According to an implementation of the disclosure, the at least one first resource includes a first sub-resource and a second sub-resource, the first sub-resource is adjacent to the second sub-resource in time domain or frequency domain, the first sub-resource includes a resource occupied by a first reference signal and the second sub-resource includes a resource occupied by a second reference signal. The preset condition includes: a first target overlapping resource and a second target overlapping resource are determined as the available resource when the first target overlapping resource does not include the resource occupied by the first reference signal or includes part of the resource occupied by the first reference signal and when the second target overlapping resource includes all or part of the resource occupied by the second reference signal. The target overlapping resource includes the first target overlapping resource and the second target overlapping resource, and the first target overlapping resource is an overlapping resource between the first sub-resource and the at least one second resource, and the second target overlapping resource is an overlapping resource between the second sub-resource and the at least one second resource.

According to an implementation of the disclosure, the first reference signal and the second reference signal are used for joint channel estimation.

It is to be understood that, the terminal device 500 according to the implementation of the disclosure can correspond to the terminal device 300 in some implementations of the disclosure, and can execute a corresponding main body in the method 100 according to the implementation of the disclosure, and the above and other operations and/or functions of each unit in the terminal device 500 are respectively configured to implement corresponding process of the terminal device in each method of FIG. 1 to FIG. 6, which will not be elaborated for the sake of brevity.

As a result, the terminal device in some implementations of the disclosure determines, using the resources configured by the network device, the available resource among the at least one first resource, which is configured for transmission of the grant-free data and/or the semi-persistently scheduled data, in a target time unit, and uses the available resource for transmission of the grant-free data and/or the semi-persistently scheduled data. In this way, the semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

Figure 10:
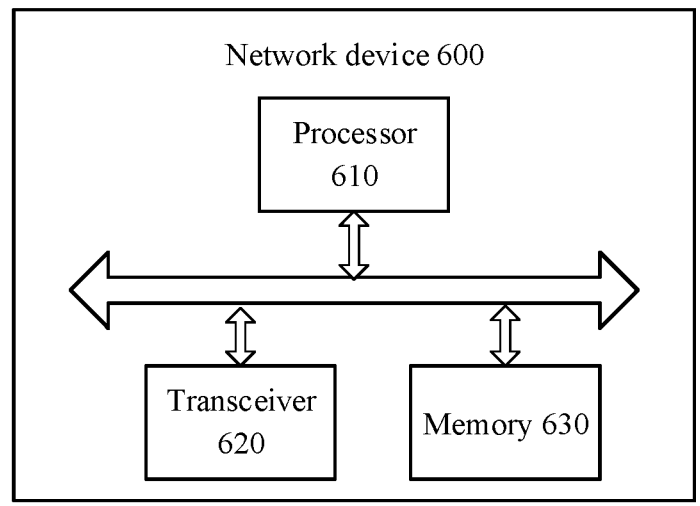
FIG. 10 is another schematic block diagram of a network device according to an implementation of the disclosure.

FIG. 10 is a schematic block diagram of a network device 600 according to an implementation of the disclosure. As illustrated in FIG. 10, the network device 600 includes a processor 610 and a transceiver 620 and the processor 610 is connected to the transceiver 620. According to an implementation of the disclosure, the network device 600 also includes a memory 630, which is connected to the processor 610. The processor 610, the memory 630, the transceiver 620 communicate with each other via an internal connection line to transfer and/or control a data signal. The memory 630 may be configured to store instructions, and the processor 610 is configured to execute the instructions stored in the memory 630 to control information or the signal transmitted by the transceiver 620. The processor 610 is configured to determine at least one first resource, which is for carrying grant-free data and/or semi-persistently scheduled data, in a target time unit, determine a resource allocation of the terminal device in the target time unit and determine an available resource among the at least one first resource; the transceiver 620 is configured for transmission of the grant-free data and/or semi-persistently scheduled data via the available resource with the terminal device.

As a result, the network device in some implementations of the disclosure configures a resource for the network device, so that the network device and the terminal device determine the available resource among the at least one first resource, which is configured for transmission of the grant-free data and/or the semi-persistently scheduled data, in a target time unit, and use the available resource for transmission of the grant-free data and/or the semi-persistently scheduled data. In this way, semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

According to an implementation of the disclosure, the transceiver 620 is also configured to transmit a configuration signaling, which is configured to indicate the at least one first resource, to the terminal device after the processor 610 determines the at least one first resource in the target time unit.

According to an implementation of the disclosure, the transceiver 620 is also configured to transmit resource information, which is configured to indicate the resource allocation, to the terminal device after the determination unit determines resources configured for the terminal device in the target time unit.

According to an implementation of the disclosure, the resource information indicates at least one bandwidth part and/or a slot format of the target time unit.

According to an implementation of the disclosure, the processor 610 is configured to determine at least one second resource in the target time unit according to the resource allocation, the at least one second resource having a same target feature as a target feature of the at least one first resource and determine the available resource among an overlapping resource between the at least one first resource and the at least one second resource.

According to an implementation of the disclosure, the target feature includes at least one of: a transmission direction, a subcarrier spacing or a cyclic prefix length.

According to an implementation of the disclosure, the processor 610 is configured to determine a target overlapping resource as the available resource when the target overlapping resources in the at least one overlapping resource between the at least one first resource and the at least one second resource satisfy a preset condition.

According to an implementation of the disclosure, each of the at least one overlapping resource includes at least one time-domain symbol and the preset condition includes: the target overlapping resource is determined as the available resource when a number of the at least one time-domain symbol included in the target overlapping resource is greater than or equal to a preset value.

According to an implementation of the disclosure, the preset value is equal to a number of the time-domain symbols included in one of the at least one first resource.

According to an implementation of the disclosure, the network device also does the following operation: configuration information, which is configured to indicate the preset value, is transmitted to the terminal device.

According to an implementation of the disclosure, the at least one overlapping resource includes a resource occupied by a reference signal and the preset condition includes: the overlapping resource is determined as the available resource when the target overlapping resource includes the resource occupied by the reference signal and the reference signal includes part or all of reference signals corresponding to a target antenna interface, the target antenna interface being an antenna interface of at least one antenna interface configured for transmission of the grant-free data and/or semi-persistently scheduled data.

According to an implementation of the disclosure, the at least one first resource includes a first sub-resource and a second sub-resource, the first sub-resource is adjacent to the second sub-resource in time domain or frequency domain, the first sub-resource includes a resource occupied by a first reference signal and the second sub-resource includes a resource occupied by a second reference signal. The preset condition includes: a first target overlapping resource and a second target overlapping resource are determined as the available resource when the first target overlapping resource does not include the resource occupied by the first reference signal or includes part of the resource occupied by the first reference signal and when the second target overlapping resource includes all or part of the resource occupied by the second reference signal. The target overlapping resource includes the first target overlapping resource and the second target overlapping resource, and the first target overlapping resource is an overlapping resource between the first sub-resource and the at least one second resource, and the second target overlapping resource is an overlapping resource between the second sub-resource and the at least one second resource.

According to an implementation of the disclosure, the first reference signal and the second reference signal are used for joint channel estimation.

It is to be understood that the network device 600 according to the implementation of the disclosure can correspond to the network device 400 in some implementations of the disclosure, and can execute a corresponding main body in the method 200 according to the implementation of the disclosure, and the above and other operations and/or functions of each unit in the network device 600 are respectively configured to implement corresponding process of the network device in each method of FIG. 1 to FIG. 6, which will not be elaborated for the sake of brevity.

As a result, the network device in some implementations of the disclosure configures a resource for the network device, so that the network device and the terminal device determine the available resource among the at least one first resource, which is configured for transmission of the grant-free data and/or the semi-persistently scheduled data, in a target time unit, and use the available resource for transmission of the grant-free data and/or the semi-persistently scheduled data. In this way, the semi-statically configured grant-free transmission resources are enabled to better adapt to an actual situation of the transmission resources, especially the situation in which time-domain and frequency-domain resources are dynamically indicated, thereby it is possible to avoid conflicts in the resource allocation.

It is to be noted that the method according to the implementations of the disclosure may be applied to a processor or implemented by the processor. The processor may be an integrated circuit chip with a signal processing capability. In an implementation process, each operation of the method implementations may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in some implementations of the disclosure may be implemented or executed. The universal processor may be a microprocessor or the processor may also be any conventional processor and the like. The operations of the methods disclosed in combination with the implementations of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It is to be understood that the memory in some implementations of the disclosure may be a volatile memory or a nonvolatile memory, or may include both the volatile and nonvolatile memories. The nonvolatile memory may be a read only memory (ROM), a programmable ROM (PROM), an Erasable PROM (EPROM), an electrically EPROM (EEPROM) or a flash memory. The volatile memory may be a random access memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

Those skilled in the art may realize that the units and algorithm steps of each example described in combination with the implementations disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn indicating that specific working processes of the system, device and unit described above may be seen from the corresponding processes in the method implementation for convenient and brief description and will not be elaborated herein.

In some implementations provided by the disclosure, it is to be understood that the disclosed system, device and method may be implemented in another manner. The device implementation described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the implementations according to a practical requirement.

In addition, each function unit in each implementation of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer device (which may be a personal computer, a server, network device or the like) to execute all or part of the operations of the method in each implementation of the disclosure. The abovementioned storage medium includes: various media capable of storing program codes such as a U disk, a mobile hard disk, a ROM, a RAM, a magnetic disk or an optical disk.

The above are only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmission of uplink data, applied to a terminal device, comprising:
   determining a first resource according to a configuration signaling, the first resource comprising a resource occupied by a reference signal and the first resource being for uplink transmission; and
   in response to that a quantity of first symbols is greater than a preset value, sending the uplink data on the first symbols, the first symbols being symbols in the first resource that are comprised in a second resource, and the second resource being determined by the terminal device based on received resource information, wherein an available resource for the uplink transmission is determined by a target overlapping resource among at least one overlapping resource between the first resource and the second resource, in response to the target overlapping resource comprising the resource occupied by the reference signal and the reference signal comprising part or all of reference signals corresponding to a target antenna interface, wherein the target antenna interface is configured for sending the uplink data.

2. The method of claim 1, wherein the resource information is for indicating a resource allocation in a time unit.

3. The method of claim 1, wherein the uplink data is grant-free data or semi-persistently scheduled data.

4. The method of claim 2, wherein the time unit is a slot.

5. The method of claim 1, wherein the resource information is a Radio Resource Control (RRC) signaling.

6. A method for transmission of uplink data, applied to a network device, comprising:

sending a configuration signaling to a terminal device, the configuration signaling being for the terminal device to determine a first resource, and the first resource comprising a resource occupied by a reference signal and the first resource being for uplink transmission;

sending resource information to the terminal device, the resource information being for the terminal device to determine a second resource; and in response to that a quantity of first symbols is greater than a preset value, receiving the uplink data on the first symbols, the first symbols being symbols in the first resource that are comprised in the second resource, wherein an available resource for the uplink transmission is determined by a target overlapping resource among at least one overlapping resource between the first resource and the second resource, in response to the target overlapping resource comprising the resource occupied by the reference signal and the reference signal comprising part or all of reference signals corresponding to a target antenna interface, wherein the target antenna interface is configured for sending the uplink data.

7. The method of claim 6, wherein the resource information is for indicating a resource allocation in a time unit.

8. The method of claim 6, wherein the uplink data is grant-free data or semi-persistently scheduled data.

9. The method of claim 7, wherein the time unit is a slot.

10. The method of claim 6, wherein the resource information is a Radio Resource Control (RRC) signaling.

11. A terminal device, comprising:

a memory storing processor-executable instructions; and a processor arranged to execute the stored processor-executable instructions to perform operations of:

determining a first resource according to a configuration signaling, the first resource comprising a resource occupied by a reference signal and the first resource being for uplink transmission; and in response to that a quantity of first symbols is greater than a preset value, sending uplink data on the first symbols, the first symbols being symbols in the first resource that are comprised in a second resource, and the second resource being determined by the terminal device based on received resource information, wherein an available resource for the uplink transmission is determined by a target overlapping resource among at least one overlapping resource between the first resource and the second resource, in response to the target overlapping resource comprising the resource occupied by the reference signal and the reference signal comprising part or all of reference signals corresponding to a target antenna interface, wherein the target antenna interface is configured for sending the uplink data.

12. The terminal device of claim 11, wherein the resource information is for indicating a resource allocation in a time unit.

13. The terminal device of claim 11, wherein the uplink data is grant-free data or semi-persistently scheduled data.

14. The terminal device of claim 12, wherein the time unit is a slot.

15. The terminal device of claim 11, wherein the resource information is a Radio Resource Control (RRC) signaling.

* * * * *